Sept. 13, 1955  G. W. MEEK  2,717,514
STRUCTURAL JOINT SEAL
Filed Sept. 22, 1950
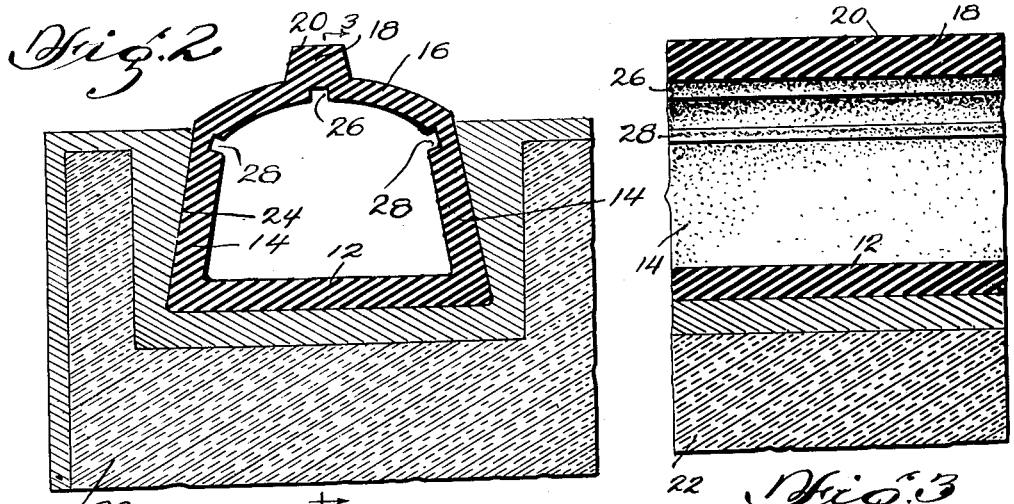
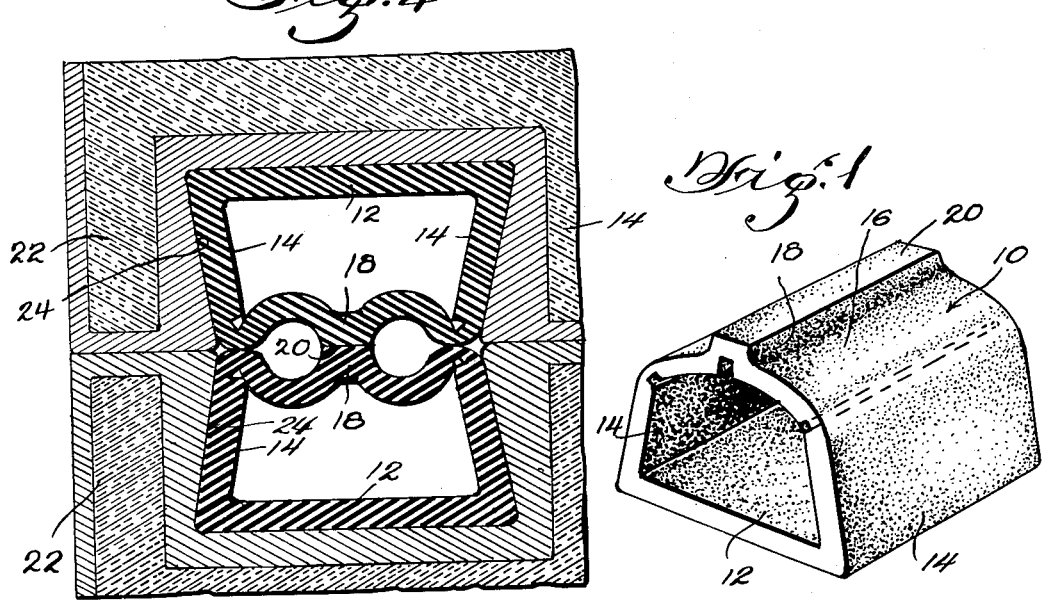
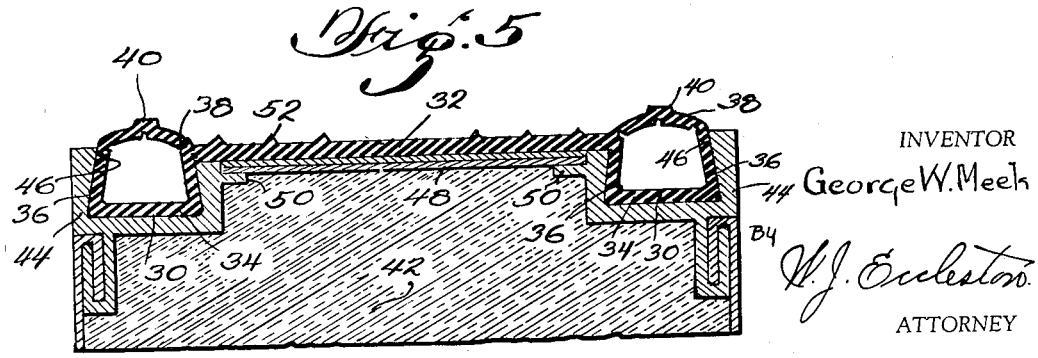
INVENTOR
George W. Meek
BY
W. J. Eccleston
ATTORNEY Patented Sept. 13, 1955

2,717,514

STRUCTURAL JOINT SEAL

George W. Meek, Pelham, N. Y., assignor to the United States of America as represented by the Secretary of the Army Application September 22, 1950, Serial No. 186,278

1 Claim. (Cl. 72—106)

The present invention relates to gaskets for making an airtight seal between abutting surfaces and, more specifically, to a gasket adapted particularly for making an airtight seal with a counterpart gasket.

An object of the invention is to provide a new and improved gasket upon which a raised ridge or bead is provided to form a seal with the corresponding part of a counterpart gasket.

A more specific object of the invention is to provide a new and improved gasket having a sealing ridge yieldably supported by hollow wall structure of resilient deformable material which is scored to yield equally on opposite sides of the bead in response to pressure on the latter to prevent tilting of the same and thus insure flat abutting engagement between the sealing beads of opposed gaskets.

Another object of the invention is to provide a new and improved sealing gasket in which a plurality of raised sealing ridges or beads are yieldably supported in parallel spaced relation by yieldable wall structures which wall structures are interconnected by a web cooperating with the sealing ridges to form a seal with a counterpart gasket opposed thereto.

A general object of the invention is to provide a new and improved gasket which may be extruded from rubber or synthetic rubber-like material so that it is inexpensive to construct, relatively long lived and easy to apply but which, nevertheless, is efficient in use.

These and other objects, advantages and capabilities of the invention will become apparent from the following description wherein reference is had to the accompanying drawing in which:

Fig. 1 is a perspective view of the improved gasket of the present invention;

Fig. 2 is a transverse sectional view through the improved gasket of the present invention and through a fragment of a suitable frame or panel for mounting the gasket;

Fig. 3 is a longitudinal sectional view through the gasket and frame taken on the line 3—3 of Fig. 2;

Fig. 4 is a transverse sectional view of a pair of gaskets in cooperating sealing engagement and fragments of frames in which these gaskets are supported; and Fig. 5 is a transverse sectional view on a reduced scale of a modification of the invention.

Although the gasket of the present invention will be described as used to form an air tight seal between the opposed edges of contiguous wall members or panels in a knockdown structure such as a knockdown refrigerated warehouse, it is to be understood that this is illustrative only and that the basket is adaptable for numerous analogous uses.

Referring to Fig. 1, it will be seen that the improved gasket of the present invention indicated in its entirety by the number 10 comprises an elongated generally tubular body having a flat base and side walls 12 and 14 respectively, and an arcuate wall 16 connected to the opposite side walls 14 and curved to provide a convex outwardly facing side when the body 10 is in relaxed condition. This body may be extruded from rubber or synthetic rubber-like material so that it is elastic, moisture resistant, relatively long lived and inexpensive to construct.

Convexly curved side 16 forms the contact surface of the gasket. At the summit of this curved contact surface is an integral outwardly projecting sealing ridge or bead 18 having a flat outwardly facing side 20. This side is adapted to make contact with the corresponding side of the sealing bead in a counterpart gasket to form an airtight seal between abutting wall members or the like in which the gaskets are mounted.

In order to assure the formation of an airtight seal when the contact surfaces 16 on two of these gaskets are brought into abutting engagement, proper support must be provided therefor by the wall members or the like upon which the gaskets are used. A fragment of a wall member is indicated at 22 (Figs. 2 and 4) for the purpose of illustration. As there indicated, the frame of this wall member 22 has a groove 24 formed therein dimensioned snugly to receive the body of the gasket 10 up to the lateral boundaries of the contact surface 16 so that this contact surface projects outwardly of groove 24 when the gasket is in relaxed condition. The gaskets 10 preferably are cemented in the grooves 24 to hold them in position and to provide a leak proof union between the gaskets and the frames of wall members 22.

The grooves 24 in the ends of adjacent wall members 22 which are to be brought together are located at corresponding positions in the wall members so that corresponding parts of the gaskets 10 in these grooves will be located directly opposite each other when adjacent wall members 22 are brought into assembled relation. Under the circumstances and inasmuch as the convex contact surfaces 16 on the opposed gaskets 10 project outwardly of the grooves 24 in the opposed wall members 22, the projecting ridges or beads 18 on these opposed gaskets will be brought into abutting engagement as the wall members 22 are brought together and the convex contact surfaces will yield to allow the frames of opposed wall members 22 to be brought into firm abutting engagement.

In order to predispose the convex contact surfaces or walls 16 in opposed gaskets in abutting wall members 22 for yielding equally on opposite sides of the beads 18 to prevent tilting of these beads while the convex walls yield and thus assure flat abutting engagement between the beads, the inner side of the convex wall 16 in each gasket is scored upon the longitudinal center line of the bead as indicated at 26 (Fig. 2) and on each side thereof at the lateral border of the convex wall 16 as indicated at 28. This scoring preferably is in the form of a groove of rectangular shape in cross section; the grooves in a gasket extending parallelly throughout the length of the gasket.

Since the grooves 26 and 28 form weakened areas along the length of the gasket 10, the convex wall 16 yields along these weakened areas when pressure is applied to the flat outer side of the bead 18. Preferably, the grooves 26 and 28 are of such depth that the bead 18 may be depressed far enough to cause the walls 16 of the abutting gaskets in the confronting edges of contiguous wall members 22 to assume a concave form and to cause the lateral edges or boundaries of these walls 16 to be brought into contacting engagement as shown in Fig. 4, thereby to increase the sealing effect obtained between opposed gaskets.

The modification of the invention disclosed in Fig. 5 differs from that just described in that it consists of a pair of similar tubular body members 30 interconnected by a web 32 integral with the contiguous side walls of the tubular body members 30. This gasket preferably is an extrusion of rubber or a resilient synthetic rubber-like material. Each of the tubular bodies 30 are similar in construction to the gasket 10 previously described and have a base 34, side walls 36, and a convex contact surface 38 with a bead 40 projecting outwardly therefrom. The web 32 interconnecting the bodies 30 is connected thereto at the contiguous lateral boundaries of the convex contact surfaces 38 of the tubular bodies forming the complete gasket.

A wall member or panel 42 in which the modified gasket is mounted has peripheral frames 44 provided with spaced recesses or grooves 46 for receiving the tubular bodies 30 of the modified gasket. The frames for these panels may be of unitary construction or separate frames may be used spaced by a rigid spacing or backing strip 48. This strip rests on and is supported by lugs or flanges 50 projecting inwardly of the inwardly facing sides of the frame members 44.

When the gasket is in position in the edge of the wall member 42, the backing strip 28 supports the web 32 of the gasket and since the outer side of this web is substantially at the level of the lateral edges of convex contact surfaces 38 on the tubular body members 30, the webs of abutting panels will be brought into confronting engagement when adjacent wall members provided with these gaskets are brought into abutting engagement. The webs 32 thus provide an additional sealing area between adjacent panels and the sealing effect of these webs can be increased by providing staggered ridges 52 on the outer side of the webs of abutting gasket.

While preferred embodiments of the invention have been shown and described, it will be apparent that numerous variations and modifications thereof may be made without departing from the underlying principles of the invention. It is desired, therefore, by the following claims, to include within the scope of the invention, all such variations and modifications by which substantially the results of the invention may be obtained through the use of substantially the same or equivalent means.

I claim:

A device of the character described comprising in combination a structural member having a flat surface for abutting engagement with a companion structural member, said structural member being provided with a dovetailed groove opening through the flat surface and having side walls converging toward the flat surface and a bottom wall, and a relatively thick walled substantially tubular gasket of resilient material arranged substantially bodily within the dovetailed groove and having a bore, said gasket including substantially flat converging side walls arranged inwardly of the side walls of the groove and contacting the side walls of the groove over substantially their entire areas, the side walls of the gasket having their outer ends terminating substantially in alignment with said flat surface of the structural member, the gasket having a substantially flat bottom wall engaging the bottom wall of the groove and an outer transversely curved convex wall projecting somewhat outwardly of said flat surface when the tubular gasket is uncompressed, the outer wall of the gasket having its marginal sides secured to the gasket side walls adjacent to the flat surface of the structural member, the outer wall of the gasket being provided upon its outer face with an integral longitudinal rib disposed at the transverse center of the gasket and projecting forwardly of the same and having a forward contact side for engagement with the companion structural member, the gasket being provided in its inner surface adjacent to the junctions of the side and outer walls of the gasket with longitudinal grooves, the grooves being spaced equidistantly laterally of the rib, there being an additional longitudinal groove in the inner surface of the outer wall of the gasket adjacent to the longitudinal rib and substantially parallel therewith and spaced equidistantly laterally of the first-named grooves, engagement of the forward contact side of the rib with the companion structural member compressing the outer convex wall of the gasket inwardly so that the same is arranged bodily within the bore of the gasket and between the side walls of the gasket in a substantially concave condition, the forward contact side of the rib then being flush with said flat surface of the structural member, the converging side walls of the groove resisting lateral spreading of the outer wall and side walls of the gasket when the gasket is compressed, whereby marginal portions of the gasket at the junctions of the outer wall and side walls of the gasket are forced into sealing engagement with the companion structural member for forming with the longitudinal rib a triple seal along laterally spaced longitudinal lines, the first and second named longitudinal grooves allowing the tubular gasket to bend readily when compressed and thereby aiding in preventing lateral shifting or twisting of the outer wall of the gasket and rib.

References Cited in the file of this patent

UNITED STATES PATENTS

| Number | Name | Date |
| --- | --- | --- |
| 1,318,001 | Upson | Oct. 7, 1919 |
| 1,759,685 | Brucker | May 20, 1930 |
| 1,883,609 | Dennis | Oct. 18, 1932 |
| 2,263,831 | Welch | Nov. 25, 1941 |
| 2,306,990 | Essl | Dec. 29, 1942 |
| 2,379,193 | Shields | June 26, 1945 |
| 2,400,493 | Fischer | May 21, 1946 |
| 2,406,629 | Petkwitz | Aug. 27, 1946 |
| 2,554,610 | Benson | May 29, 1951 |